United States Patent [19]

Tryller et al.

[11] Patent Number: 5,767,401
[45] Date of Patent: Jun. 16, 1998

[54] DEVICE FOR SURVEYING SUBTERRANEAN SPACES OR CAVERNS

[75] Inventors: Hartmut Von Tryller, Hildesheim; Reinhard Wildner, Sehnde, both of Germany

[73] Assignee: SOCON Sonar Control, Kavernenvermessung GmbH, Giessen, Germany

[21] Appl. No.: 810,396

[22] Filed: Mar. 4, 1997

Related U.S. Application Data

[63] Continuation-in-part of Ser. No. 505,694, Jul. 21, 1995, abandoned.

[30] Foreign Application Priority Data

Jul. 27, 1994 [DE] Germany .................. 44 26.501.8

[51] Int. Cl.[6] .................. E21B 47/00; G01B 1/00
[52] U.S. Cl. .................. 73/152.54; 33/544.2
[58] Field of Search .................. 73/178 R, 152.54, 73/152.46; 175/40; 33/544.2, 544.3

[56] References Cited

U.S. PATENT DOCUMENTS

| | | | |
|---|---|---|---|
| Re. 31,074 | 11/1982 | Nolte | 73/151 |
| 2,622,334 | 12/1952 | Wiley | 33/544.3 |
| 2,771,686 | 11/1956 | Hamontre et al. | 33/544.3 |
| 3,183,600 | 5/1965 | Jay | 33/544.2 |
| 3,752,255 | 8/1973 | Hill et al. | 181/5 NP |
| 3,780,571 | 12/1973 | Wiesener | 73/67.8 S |
| 3,961,683 | 6/1976 | Delignieres | 181/102 |
| 4,021,774 | 5/1977 | Asmundsson et al. | 340/18 R |
| 4,071,959 | 2/1978 | Russell et al. | 33/312 |
| 4,121,345 | 10/1978 | Roesner | 33/178 F |
| 4,766,577 | 8/1988 | Clerke et al. | 367/911 |
| 4,829,488 | 5/1989 | Siegfried, II | 367/69 |
| 4,845,990 | 7/1989 | Kitzinger et al. | 73/597 |
| 4,930,595 | 6/1990 | Hayward et al. | 376/252 |
| 5,131,166 | 7/1992 | Weber | 33/832 |
| 5,168,470 | 12/1992 | Dennis et al. | 367/31 |
| 5,331,578 | 7/1994 | Stieler | 364/571.01 |
| 5,425,279 | 6/1995 | Clark et al. | 73/865.8 |
| 5,448,916 | 9/1995 | Shinozaki | 73/597 |
| 5,488,916 | 2/1996 | Shinozaki | |

*Primary Examiner*—Hezron E. Williams
*Assistant Examiner*—Jay L. Politzer
*Attorney, Agent, or Firm*—Collard & Roe, P.C.

[57] ABSTRACT

A system for surveying subterranean hollow spaces arranged on a cable having reinforcing jacketing. The device comprises an oblong tubular housing divided into three sections. A pivot joint connects that top section to the center section and permits rotation of the center section around a longitudinal axis of the surveying system. A tilting joint connects the center section to the bottom section to change the inclination of the bottom section around an orthogonal axis of swivel. There is a rotary drive for rotating the center section and a tilting drive for tilting the bottom section. There is an instrument in the center section for determining the rotary position of the center section. The free end of the bottom section has an exchangeable sensor carrier having a sensor for measuring the hollow space. An angle sensor is located in the bottom section for determining the absolute angle of inclination of the bottom section relative to the perpendicular. This absolute angle determination allows for accurate and precise measurements of the hollow space.

4 Claims, 2 Drawing Sheets

DEVICE FOR SURVEYING SUBTERRANEAN SPACES OR CAVERNS

CROSS-REFERENCE TO RELATED APPLICATION

This is a Continuation-in-Part application of U.S. patent application Ser. No. 08/505,694, filed on Jul. 21, 1995 now abandoned.

BACKGROUND OF THE INVENTION

1. Field of the Invention

The present invention relates to a device for surveying subterranean hollow spaces or caverns.

2. The Prior Art

Geometric surveying with ultrasound sensors is of decisive importance in connection with cavern and cavity monitoring, because the results represent the basis for the assessment of the stability of the hollow space or cavern. The space or cavern is used to deposit materials such as natural gas, oil, etc., which are usually artificially made for such purposes, for example by flushing operations.

To accomplish geometric surveying with ultrasound of the shape and volume or form of the surface of subterranean hollow spaces (cavities) and caverns, measuring probes have to be introduced via a steel-armbred drilling hole cable into depths of up to 3000 m, with subterranean temperatures of up to about +75° C. and under pressures of up to 300 bar.

Accuracy in surveying, however, is substantially dependent on the structure and arrangement of the measuring sensors used, and on their exact positioning and association in the overall system. To completely survey a hollow space, it is absolutely necessary for the measuring sensors to be turnable by rotary motions in the horizontal plane, and tiltable by tilting motions in an orthogonal plane relative to the horizontal plane, so that measurements can be carried out at all possible spatial angles. Therefore, for exact surveying, the precise spatial alignment of the respective measuring sensor has to be detected, or must be known. To accomplish this, the sensor's angle of inclination also has to be known, in addition to the angle of direction, such as on the compass rose.

A device that is basically suitable for the technology specified above has been disclosed in U.S. Pat. No. RE31, 074 to Nolte.

However, with the known measuring system, the measuring sensor's angle of inclination is not determined directly or absolutely in a suitable reference system, but only relatively. In the prior art device, the tiltable sensor carrier supporting the measuring sensor is driven by a tilting motor operating with a suitable gear transmission for performing the desired tilting movement. In order to adjust the desired tilt or inclination angle, the adjusted angle is determined by detecting the amount of movement carried out within the range of the gearing or motor, with a step switch or step counter, and terminating the adjustment according to an incrementation of the step counter after a preset nominal value has been reached. Following such indirect, relative determination and adjustment of the angle of inclination, it is then assumed that the sensor's angle is known.

Such indirect measurement of the angle of inclination, however, can lead to inaccuracies. Determining the angle of inclination solely on the basis of driving parameters disregards other parameters acting on the sensor carrier. These other parameters may show that the relatively determined angle of inclination of the sensor carrier does not actually correspond with the angle of inclination with respect to the perpendicular, i.e., with the vector of the earth movement in that site. The perpendicular vector actually should be viewed, and is viewed as being adjusted, and is also used as the basis in the mathematical interpretation of the results measured by the probes.

One parameter that is ignored in the indirect prior art method is the slackness present in the motor, in the gear transmission, or in some of the couplings between the tilting drive and the sensor support to be tilted. Such slackness is undesirable but normally present for engineering reasons. However, such slackness is not detected with the prior art method, and left out of the calculation, therefore affecting the accuracy of the measurements.

Furthermore, the surveying equipment overall could be in an oblique position, i.e., have its own angle of inclination relative to the perpendicular. For example, the hole, may not be drilled exactly perpendicularly, so that because of the correspondingly extending tubing of the hole drilled, the surveying device is lowered into the hollow space to be surveyed in a slanted way.

Moreover, shifts in the center of gravity in the system may lead to the formation of angles of inclination of the overall system relative to the perpendicular that are not taken into account in connection with the known relative measurement of the angle of inclination. For example, even the desired tilt angle of the sensor carrier may entail a shift in the center of gravity, leading correspondingly to a slight countermovement of the total system. This countermovement then causes the overall system to obtain its own, unknown angle of inclination relative to the perpendicular.

Moreover, the varying physical conditions and circumstances in different hollow spaces to be surveyed necessitates the use of different measuring sensors for different applications. However, replacing measuring sensors may then lead to another weight distribution in the surveying device or to a different weight within the range of the measuring sensor or sensors. If the respective sensor carrier is tilted with different measuring sensors having different weights, this also changes the tilting movement of the entire device from the perpendicular. The tilting movement is therefore functionally dependent upon the weight of the measuring sensors used as an unknown quantity.

Also, any buoyancy effects that may occur, caused by medium or material contained in the cavern or hollow space, vary accordingly, and influence the overall system as well. Therefore, a relative determination of the inclination of the measuring sensors via the tilting motor and the transmission conditions there, leads to incalculable errors and finally to great differences in the hollow-space volume to be determined. Therefore, use of this type of measurement for volume balances and for assessing stability is no longer acceptable.

Therefore, the present invention attempts to overcome the problems of the device of the type specified above, by taking into account the requirements and problems in connection with the operation of the device using a drilling hole cable of up to 3000 m length in different filling media such as brine, water, gas, oil, etc., and, while avoiding the aforementioned problems, permits a higher measuring accuracy to adequately satisfy the operational requirements.

SUMMARY OF THE INVENTION

It is therefore an object of the present invention to overcome the drawbacks of the prior art and to provide a device for surveying subterranean hollow spaces or caverns.

The device comprises a surveying system which is arranged on the end of a cable that preferably has a reinforcing jacketing. With the help of the cable, the surveying system can be lowered into the hollow space to be surveyed through a drilled hole leading into the hollow space. The surveying system is connectable via the cable to an energy supply and/or to measuring indicator instruments or measurement-recording instruments.

The surveying system preferably comprises an oblong, largely tubular housing closed at its face sides, such housing protecting the structural elements and components accommodated in its interior against the physical conditions prevailing in the drilled hole or in the cavern to be surveyed. The surveying system, including its housing, is mechanically divided in a known way into at least three sections. The section disposed on top after the surveying system has been lowered into the hollow space is connected with the adjacent center section by a pivot joint, which permits a relative rotation of the center section around the longitudinal axis of the surveying system. The center section and the bottom section are connected to each other by a tilting joint, which allows the lower section to change its inclination versus the center section by swinging around an orthogonal swivel axis relative to the longitudinal axis of the surveying system.

The surveying system comprises a rotary drive for rotating the center section, and a tilting drive for tilting the bottom section. The center section comprises an instrument for determining its rotary position, for example a compass. The bottom section has an exchangeable sensor carrier near its free end, which preferably forms a part segment of the bottom section. The sensor carrier supports at least one measuring sensor of a known type and preferably operates with ultrasound according to the principle of an echo sounder, for measuring the hollow space. The bottom section of the surveying system has an angle sensor of a known type for determining the given absolute angle of inclination of the bottom section, relative to the perpendicular.

Therefore, the device according to the invention advantageously comprises an angle sensor capable of directly and absolutely measuring the angle of inclination of the bottom section of the surveying system with respect to the perpendicular. It is possible to use an angle sensor of the known type used for this purpose. For other purposes, such as in the field of aircraft or rocket technology, for example, an electrically capacitively operating liquid sensor may be used.

Due to the fact that the angle of inclination of the bottom section of the surveying system is directly measured with respect to the perpendicular, all other parameters are measured as well. Thus, changes in the angle of the tilt, if any, caused by slackness within the zone of the tilting motor transmission, or inclination movements caused by shifts in the center of gravity, or tilt angle components already preset by drilled holes not extending in an exactly perpendicular way, are all taken into account.

In interpreting the measurements of the measuring sensor, it is possible to take into account the absolute position of the measuring sensor in the geographic reference system. With the instrument for determining the rotary position, such as a compass which also measures the absolute rotary position of the measuring sensor, it is consequently possible to mathematically vectorially detect, with absolutely known and exact space components, the axis of measurement of the measuring sensor in the space, i.e., in the geographic reference system, and to take into account the axis of measurement. Also, changes in the position of the measuring sensor are measured absolutely by the angle sensor and the compass, so that it is always possible to exactly allocate the measured values to the actual directions of measurement. Thus, a mathematically exact image of the hollow space to be surveyed, including a volume balance, can be obtained.

Another further development of the invention is the arrangement of the aforementioned angle sensor in the bottom section separate from the part segment formed by the exchangeable sensor carrier. The angle sensor is located within a base segment of the bottom section, and the part segment formed by the sensor carrier is connected with the base segment of the bottom section via a coupling. The coupling uses form-locking elements to ensure that the sensor carrier is connected with the base subsection of the bottom section in a way that is completely secured against torsion and tilting and without slackness. This connection also allows mechanical and electrical coupling of the two sections.

With the device of the present invention the measuring accuracy results from the fact that the measuring sensor's axis of measurement is known due to absolute measurement of the space angle. Thus, it is necessary to create an accordingly suitable coupling between the exchangeable sensor carrier and the base part segment on which such sensor carrier is arranged. This is because an exchange of the sensor carrier could change the position of the measuring sensor relative to the angle sensor measuring the position, even if only slightly. However, such a fitted coupling can be made with precise form-locking elements, to eliminate any slackness.

Such form-locking couplings must be used at other points of the surveying device if it is desired to separate sections of the surveying system from each other. This type of coupling enables the measuring sensor, whose position is to be measured absolutely, to be temporarily separated from the position-measuring sensor, or replaced by another measuring sensor. Therefore, such a coupling can also be used between the instrument for the determination of the rotary position of the center section and the measuring sensor, to create temporary separation between the instrument in the center section and the measuring sensor present in the bottom section.

The device according to the invention also preferably has a controlling system for controlling the tilting drive and/or the rotary drive. This system is connected to the sensor that detects the angle of inclination and is suitable for transmitting data, taking into account the measured results.

This connection between the angle sensor and the instrument for determining the rotary position of the center section relative to the corresponding drive avoids measurement errors because of the absolute determination of the position of the measuring sensor. This connection also allows for adjustment of the measuring sensor to a desired position by controlling the drives accordingly, taking into account the actually measured position of the measuring sensor. Thus, via a feedback branch, the measuring sensor is adjusted to a desired measuring position if the actual, absolutely measured position deviates from the desired position. It is thus possible to ensure that the actual position of the measuring sensor is in fact taken into account in the interpretation of the measurements, and also, that the measuring steps, i.e., the steps for changing the position, are actually followed. These steps are preset and are useful, for example, to scan and measure points of the hollow space or of its walls so that a uniform network of measured data is obtained. This network enables the graphic reproduction of the surveyed hollow space in a three-dimensional representation.

According to another development of the invention, the device according to the invention comprises a device for stabilizing a desired movement and for suppressing any undesired movement of the surveying system. This device operates in a known way and uses a gyroscope for maintaining the rotary pulse or movable countermasses.

The surveying system suspended on the cable could be put into an oscillating motion, pendulum movement or rotary motion by some vibration, for example. Such motions are undesirable for the measurement itself because at the time the measurement is taken with the measuring sensor, the surveying system should be as motionless as possible. With the help of the device according to the invention for suppressing an undesirable motion, thus undesirable motion could be suppressed or slowed down until immovability is obtained. Immobility can be maintained, for example, by a gyro that maintains the rotary pulse.

Undesirable motions or vibrations may be additionally caused by further rotation or further tilting of the measuring sensor from one measuring position to the next. These motions or vibrations keep the surveying system from resting still in the next desired measuring position. With the system for stabilizing the surveying system, further step-by-step positioning of the measuring sensor could be achieved, while avoiding or immediately suppressing undesirable superimposing motions of the surveying system.

A procedure based on a gyro-system has been basically disclosed by Stieler in U.S. Pat. No. 5,331,578, by which angles and trajectories can be measured in a drilled hole. However, the method relates to an application of gyros that is entirely different from the one according to the present invention. The application of gyros proposed according to the invention does not relate to any measurement of angles or to the course of a drilled hole, but to the stabilization of the surveying system and the measuring sensor arranged thereon in its actual, desired position. Such stabilization possibility has not been mentioned by Stieler and is, furthermore, not feasible with the procedure proposed by the prior art. With regard to compensation, Stieler refers to the compensation of errors after a reference direction has been started a second time and thus to the reproducibility of a reference direction. Therefore, such a method is not relevant in this way to the device according to the invention proposed herein.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
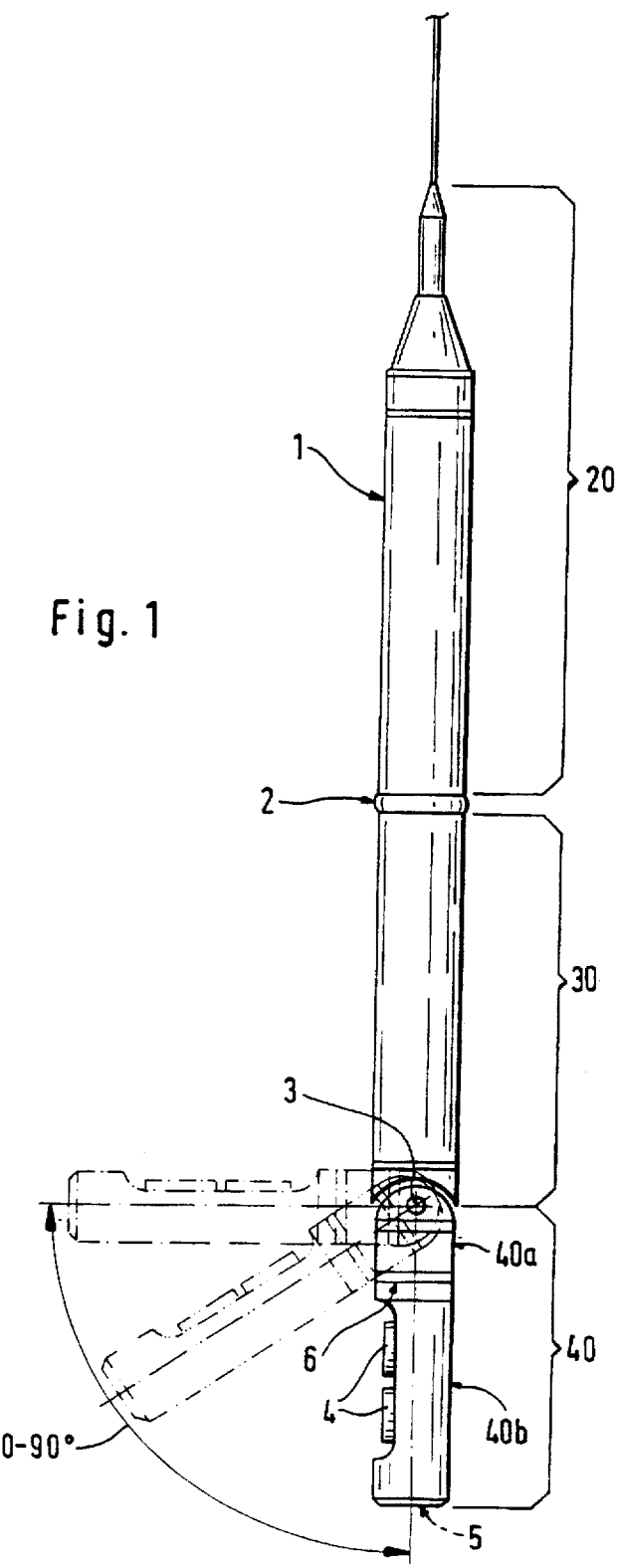
FIG. 1 shows a lateral view of a surveying system according to the invention on a cable.

Referring now in detail to the drawings and, in particular, FIG. 1, there is shown a surveying system of a device according to the invention, which is suspended on a cable, and which can be lowered by the cable into a subterranean hollow space to be measured, through a drilled hole (not shown).

The surveying system comprises a substantially tubular housing 1, which is closed at its two ends, i.e., at its two face sides, and which protects the components contained therein against the conditions in the subterranean cavity.

The surveying system is substantially mechanically divided in three sections, namely a top section 20, a center section 30 and a bottom section 40.

Top section 20 is connected with center section 30 via a pivot coupling 2 in such a way that center section 30 can be rotated with respect to top section 20 around the longitudinal axis of the surveying system or housing 1. A rotary drive 12, for example an electric motor, to drive such rotation, is accommodated in top section 20.

With the help of rotary drive 12, (shown in FIG. 2) two sections 30 and 40 are jointly rotatable and are rigidly connected to each other with respect to rotation around the longitudinal axis.

In addition, bottom section 40 is tiltable to an angle of inclination as indicated in FIG. 1 by the dashed lines and a double arrow. For this purpose, bottom section 40 is connected with center section 30 via a suitable swivel axle 3. A suitable tilting drive 14 is arranged in center section 30.

Bottom section 40 is divided in two part segments, namely in a base segment 40a and a sensor carrier 40b. Sensor carrier 40b supports the different measuring sensors 4 and 5, which operate using ultrasound, namely with the horizontally aligned horizontal sensors 4 (when bottom section 40 is not tilted) and a vertical sensor 5 that points in the axial direction of the surveying system.

Sensor carrier 40b is removable from base segment 40a of bottom section 40 so that sensor carrier 40b, which supports sensors 4 and 5 for defined measuring purposes, can be replaced by another sensor carrier 40b with other measuring sensors, for other measuring purposes. For this purpose, sensor carrier 40b and base segment 40a are connected with each other via a coupling 6. A suitable coupling permitting separation of center section 30 from top section 20 can also be contained in coupling 2.

Figure 2:
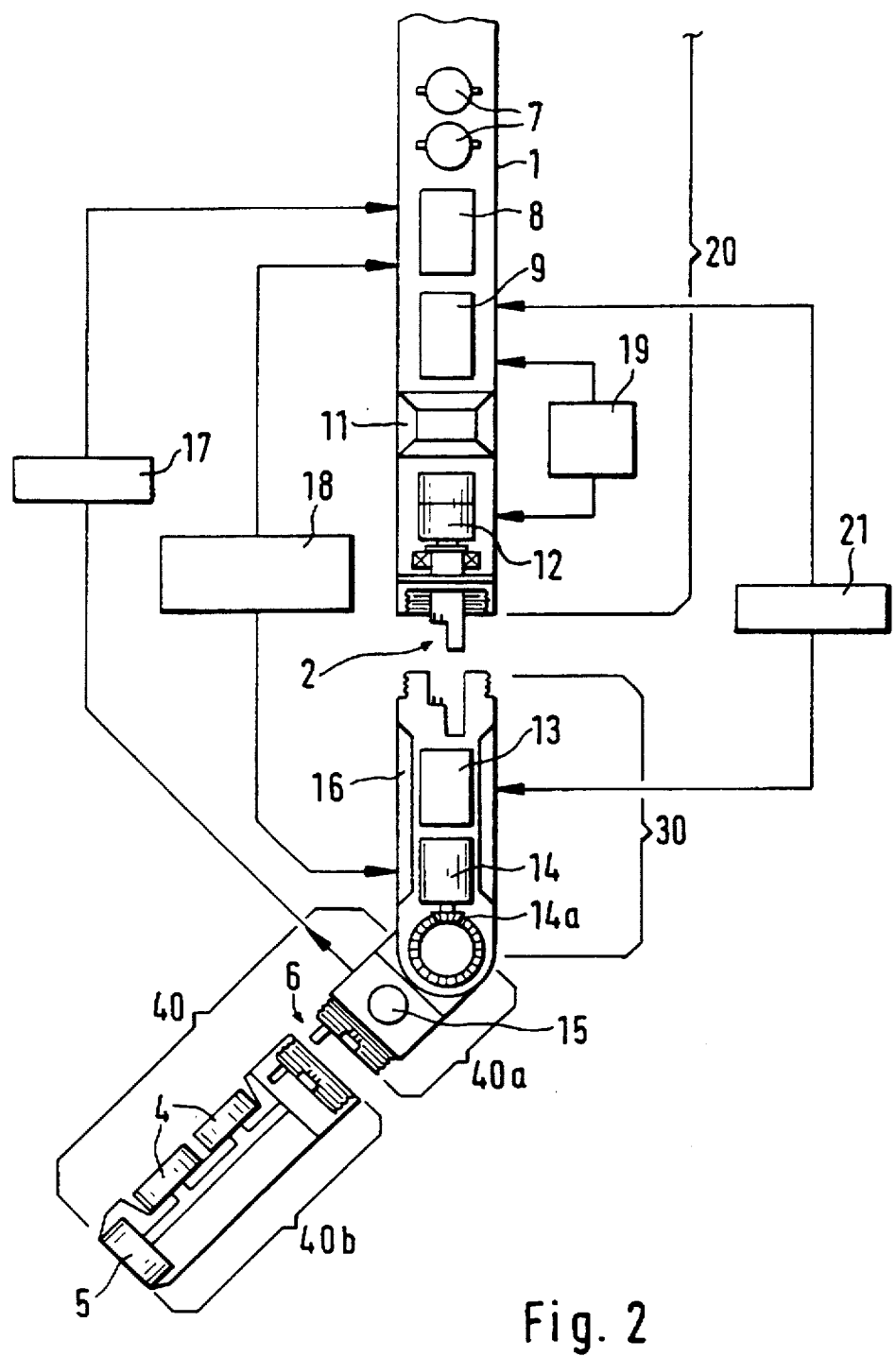
FIG. 2 shows a sectional view an assembly and circuit concept for the surveying system according to FIG. 1.

FIG. 2 shows the components within housing 1 in a schematic sectional view of a block circuit diagram, whereby the wiring of individual components is symbolically indicated. The actual wiring or connection extends within housing 1. Electric couplings, such as contact tongues for energy supply contacts, etc., are provided within the zone of couplings 2 and 6.

FIG. 2 shows stabilizers 7 disposed within the surveying system. Stabilizers 7 may comprise gyros or countermasses for stabilizing the surveying system, or for braking it when undesirable movements occur.

Furthermore, the surveying system comprises a tilt controller 8 for controlling the tilting movement of bottom section 40. A rotary controller 9 for controlling the rotary motion of center section 30 is also provided, with bottom section 40 being jointly driven. A pressure compensator device 11 and rotary drive 12 for driving center section 30 (and bottom section 40 ) are located in top section 20. An instrument 13 for absolutely measuring and determining the direction of rotation of center section 30, which may be in the form of a compass, is provided in center section 30, along with a tilting drive 14 for tilting bottom section 40 relative to center section 30 with a transmission 14a. An angle sensor 15 is located in bottom section 40 for absolutely measuring and determining the given absolute position of tilt or for determining the absolute angle of inclination of bottom section 40 relative to the perpendicular, and therefore, with respect to the vector of earth movement in the geographic measuring site. The three measuring sensors 4 and 5 are located in bottom section 40. There is also an additional pressure compensator device 16 located within the zone of center section 30.

Couplings 2 and 6 each have suitable pressure seals, which are known devices. These seals seal housing 1 against its environment at the points of separation.

Furthermore, FIG. 2 shows that couplings 2 and 6 have form-locking elements, which positively fit into each other, in addition to supplementary contact tongues, electric plugs, etc. The form-locking elements ensure that the sections of the surveying system connectable with each other via couplings 2 and 6 can be joined with one another only with a highly-defined orientation, and that such sections are rigidly joined with each other after the connection has been made, i.e., without any slackness, which means they are locked safely in view of both torsion and tilt. Such exactly fitting and positively form-locking elements of couplings 2 and 6 ensure that structural elements 13 and 15, which can be summarily viewed as position-measuring sensors, will in fact reproduce the positions held by measuring sensors 4 and 5 even if measuring sensors 4 and 5 with the associated sensor carrier 40b have been replaced by another sensor carrier 40b with other measuring sensors. Such a fitting is particularly important with coupling 6 because the exchangeable sensor carrier 40b is separated in this site, i.e., separated from position-measuring sensors 13 and 15. The respective form-locking elements also ensure that a replacement sensor carrier 40b will assume the same position as previously-used sensor carrier 40b in a very precise and reliably reproducible way.

Such exact coupling 6 with the respective form-locking elements would not be required if, for example, angle sensor 15 were arranged jointly detachable with sensor carrier 40b. However, this arrangement is not desirable for circuit engineering and mainly for cost reasons because in such a case, each sensor carrier that may be required with the appropriate measuring sensor would also have to comprise its own suitable angle sensor 15.

As shown in FIG. 2, the circuit interlinking of various components of the surveying system is indicated by association arrows. For example, angle sensor 15 is connected in terms of circuitry with corresponding tilt controller 18 via a connection 17. Tilting drive 14 is also connected via a connection 18 to tilt controller 7 controlling the drive.

Furthermore, rotary drive 12 is connected to its rotation controller 9 via a connection 19. Moreover, direction sensor 13 is connected to rotation controller 9 via a connection 21.

With the help of connections 17, 18, 19 and 21, a feedback branch is obtained and realized in each case between the controller, the drive and the respective position-measuring sensor. It is possible in this way to control the associated drive in accordance with the data obtained via the associated position-measuring sensor until the position of measuring sensors 4 and 5 measured via the position-measuring sensor, such position being the actual position, exactly corresponds with the preset should-be positions desired within the framework of the measuring operation. In particular, it is possible also with the help of the feedback branches to reproduce a defined measuring position, i.e., to find it again with the help of controllers cooperating with the associated drives.

What is claimed is:

1. A device for surveying subterranean hollow spaces, comprising a surveying system arranged on the end of a cable having reinforcing jacketing, said surveying system comprising:

an oblong, largely tubular housing, said housing having a closed top face and a closed bottom face and being divided into at least three sections comprising a top section, a center section and a bottom section having a free end;

a pivot joint connecting the top section and the center section, said pivot joint permitting relative rotation of the center section around a longitudinal axis of the surveying system;

a tilting joint connecting the center section to the bottom section, said tilting joint permitting changing of the inclination of the bottom section relative to the center section around an orthogonal axis of swivel relative to the longitudinal axis of the surveying system;

a rotary drive adapted to rotate the center section;

a tilting drive for tilting the bottom section;

an instrument located in the center section for determining the absolute rotary position of the center section;

a rotary controller for controlling the rotary motion of the center section;

an exchangeable sensor carrier forming a part of the bottom section at its free end;

at least one measuring sensor disposed in the sensor carrier, said sensor using ultrasound as an echo sounder for measuring the hollow space;

an angle sensor located in the bottom section for determining the absolute angle of inclination of the bottom section relative to the perpendicular, wherein the surveying system is lowerable into the hollow space through a drilled hole via the cable, said cable being adapted to connect the surveying system to an energy supply, measuring instruments and recording instruments, and wherein the housing protects the surveying system against the physical conditions prevailing in the drilled hole and hollow space to be surveyed.

2. A device according to claim 1, wherein the bottom section comprises a base segment and an exchangeable sensor carrier, wherein the angle sensor is arranged in the base segment, and wherein the exchangeable sensor carrier is connected with the base segment by a coupling having form-locking elements, said coupling preventing torsion and tilting and allowing for mechanical and electrical coupling of said sensor carrier with said base segment.

3. The device according to claim 1, further comprising a controlling device for controlling the tilting drive, said controlling device being connected to the angle sensor and allowing for data transmission from the angle sensor.

4. The device according to claim 1, further comprising a device for stabilizing a desired movement of the surveying system and suppressing an undesired movement of the surveying system, said device having elements selected from the group consisting of a rotating gyro and moveable countermasses.

* * * * *